United States Patent [19]

Holter

[11] Patent Number: 5,266,856
[45] Date of Patent: Nov. 30, 1993

[54] VIBRATION REDUCTION FOR ELECTRIC MOTORS

[75] Inventor: Warren G. Holter, Cincinnati, Ohio

[73] Assignee: Siemens Energy & Automation, Inc., Alpharetta, Ga.

[21] Appl. No.: 985,097

[22] Filed: Nov. 30, 1992

[51] Int. Cl.⁵ .................. H02K 5/24; F16F 15/00
[52] U.S. Cl. ..................... 310/51; 310/88; 310/89; 181/202; 181/208
[58] Field of Search .......... 310/51, 91, 52, 88, 310/89; 181/200, 202, 205, 207, 208

[56] References Cited

U.S. PATENT DOCUMENTS

| | | |
|---|---|---|
| 1,165,288 | 12/1915 | Rimmer . |
| 1,243,358 | 10/1917 | Stoddard . |
| 1,778,992 | 10/1930 | Wulfert . |
| 1,953,473 | 4/1934 | Fedders .................. 248/16 |
| 2,057,370 | 10/1936 | Dehlendorf et al. ......... 248/26 |
| 2,136,247 | 11/1938 | Kroenlein .................. 15/8 |
| 2,384,476 | 9/1945 | Lane ..................... 248/22 |
| 2,711,871 | 6/1955 | Eck ...................... 248/22 |
| 3,230,404 | 1/1966 | Graham .................. 310/51 |
| 3,253,170 | 5/1966 | Phillips et al. ............ 310/168 |
| 3,270,221 | 8/1966 | Shaffer .................. 310/51 |
| 4,007,388 | 2/1977 | Lawyer et al. ............ 310/51 |
| 4,161,812 | 7/1979 | Litch, III ............... 29/446 |
| 4,230,960 | 10/1980 | Mayher et al. ............ 310/51 |
| 4,258,821 | 3/1981 | Wendt et al. ............. 181/202 |
| 4,425,813 | 1/1984 | Wadensten ............... 74/87 |
| 4,450,373 | 5/1984 | Miller et al. ............. 310/51 |
| 4,602,176 | 7/1986 | Baker ................... 310/51 |
| 4,632,642 | 12/1986 | Meister, III et al. ....... 417/363 |
| 4,807,718 | 2/1989 | Lotz ..................... 181/202 |
| 4,914,929 | 4/1990 | Shimazaki ............... 181/202 |
| 5,026,476 | 6/1991 | Ishimoto et al. .......... 310/89 |
| 5,183,975 | 2/1993 | Craggs et al. ............ 181/202 |

Primary Examiner—Steven L. Stephan
Assistant Examiner—Matthew Nguyen

[57] ABSTRACT

A vibration reduction assembly for isolating the top cover from the machine, for use in combination with a dynamoelectric machine having a cover for guiding air into and out of the machine while protecting the machine from airborne water and dirt. The vibration reduction assembly comprises a plurality of spaced neoprene pads provided between the cover and the machine, the pads of a density and size selected to obtain low transmissibility and amplification of vibration caused by the machine thereby reducing vibration of the machine; a plurality of closed cell foam rubber strips positioned between adjacent ones of the plurality of neoprene pads, the strips for filling space between the cover and for protecting the machine from incident atmospheric precipitation and dust. The cover is affixed to the machine with a plurality of bolts, each bolt engaging a neoprene washer and a neoprene sleeve to eliminate metal to metal contact.

11 Claims, 2 Drawing Sheets

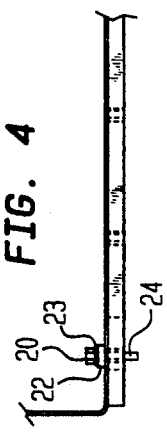
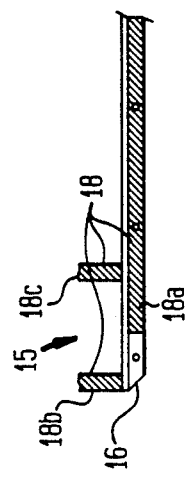
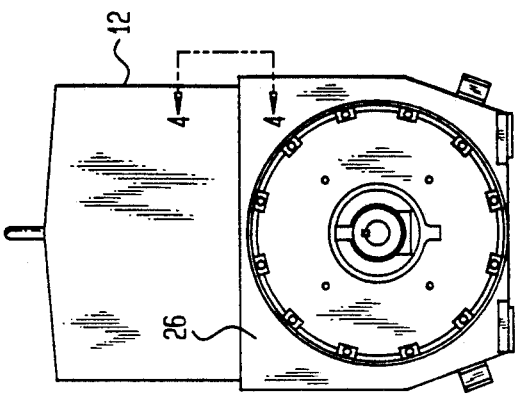
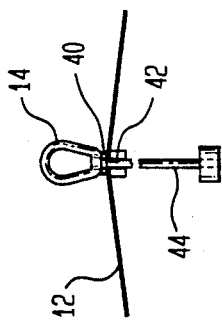
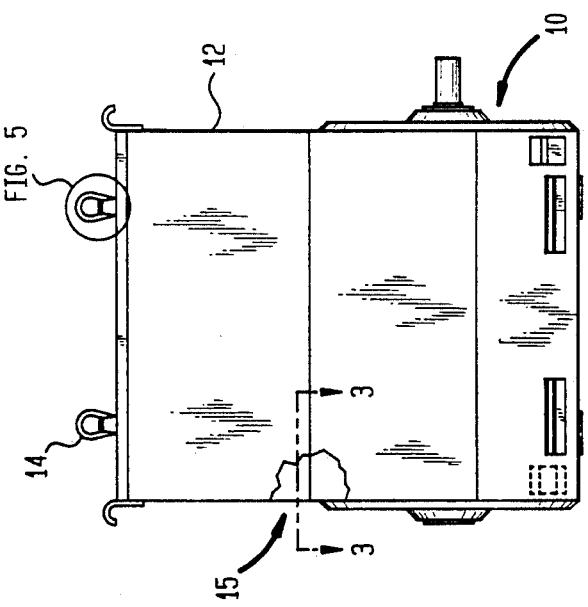

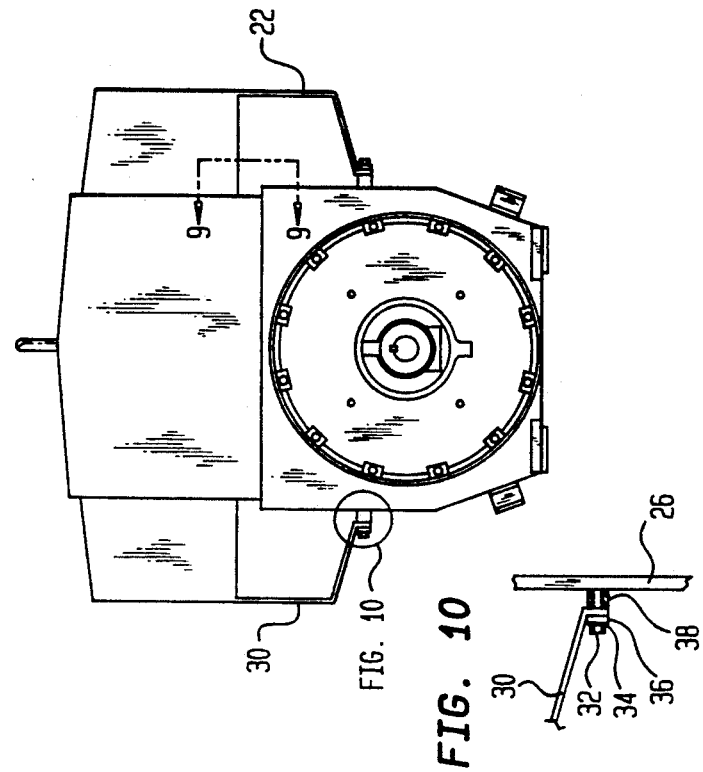
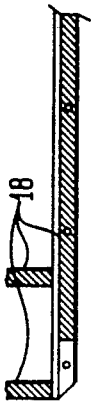
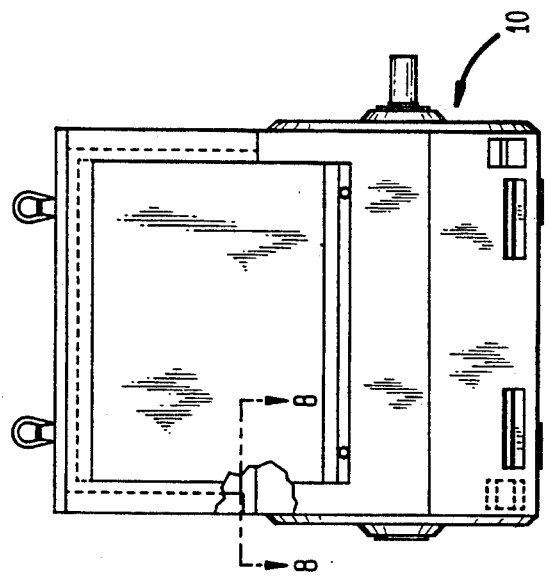
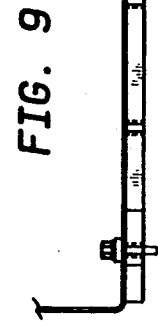

VIBRATION REDUCTION FOR ELECTRIC MOTORS

FIELD OF THE INVENTION

This invention relates to an isolation assembly for a weather resistant rotary machine, such as a high speed induction motor.

BACKGROUND OF THE INVENTION

Dynamoelectric machines, such as high speed induction motors often find uses indoors or outdoors in environments where they need to be protected from dripping fluids, rain, snow, and other forms of precipitation, as well as from dirt, dust or other particles contained in the atmosphere, all of which can interfere with the proper functioning of the motor. As a result, various housing designs have been developed to protect the moving parts inside of the yoke from the weather, while permitting adequate intake and exhaust of air to cool the machine or motor. U.S. Pat. Nos. 2,777,079 and 4,119,873 discuss dynamoelectric machines such as electric motors having a top cover to render the machine suitable for outdoor use.

One series of two pole high speed induction motors has a squarish motor bearing housing or yoke with a flat upper surface. A box-shaped cover fits on the housing and permits intake and exhaust of coolant while substantially preventing entry of dripping fluids, rain, dust, airborne dirt and other particles. The use of covers introduces vibration problems which may be exacerbated because the cover may create a resonant structure amplifying vibration of the motor. Introduction of resilient washers, however, creates a space through which air and unwanted dirt and precipitation may flow, thereby disrupting the air flow path and interfering with the weather resistance provided by the cover.

U.S. Pat. Nos. 4,007,388, 4,425,813, and 5,026,476 all seem directed to vibration problems encountered with rotary machines and electrodynamic machines such as electric motors. None of the foregoing references discusses a complete solution to the problem of efficient cooling and weather resistance of electrical apparatus combined with effective suppression of the vibration generated by the apparatus and amplified by its protective cover.

SUMMARY OF THE INVENTION

It is therefore an object of the invention to remedy the problems of existing machines noted above, and in particular to provide a vibration isolation assembly for a dynamoelectric machine having a weather resistant protective cover. Another object is to provide a vibration isolation apparatus which does not interfere with the weather resistant properties of the cover. Yet another object is to reduce the transmission of vibration from the machine to the cover and from the cover to the machine.

The foregoing and other objects are attained in accordance with the present invention. The invention provides a vibration reduction assembly for isolating the top cover from the machine, for use in combination with a dynamoelectric machine having a cover for guiding air into and out of the machine while protecting the machine from airborne water and dirt. The vibration reduction assembly comprises a plurality of spaced neoprene pads provided between the cover and the machine, the pads of a density and size selected obtain low transmissibility for vibration caused by the machine; a plurality of closed cell foam rubber strips positioned between adjacent ones of the plurality of neoprene pads, the strips filling space between the cover and protecting the machine from incident atmospheric precipitation and dust. The cover is affixed to the machine with a plurality of bolts, each bolt engaging a neoprene washer and a neoprene sleeve to eliminate metal to metal contact.

BRIEF DESCRIPTION OF THE DRAWINGS

A better understanding of the objects, features and advantages of the invention can be gained by considering the following detailed description of the preferred embodiment, taken in conjunction with the accompanying drawings wherein:

FIG. 1 is a side elevational view, partially broken away, of a dynamoelectric machine in combination with the vibration reduction assembly of the present invention;

FIG. 2 is an end elevational view of the dynamoelectric machine of FIG. 1;

FIG. 3 is a top view of a section of the vibration reduction assembly taken along line 3—3 of FIG. 1;

FIG. 4 is a view taken along line 4—4 of FIG. 2 and looking in the direction of the arrows;

FIG. 5 is a side view partially in section of a lifting device for use in the apparatus including the invention;

FIG. 6 is a side elevational view of an alternate embodiment of a dynamoelectric machine in combination with the vibration reduction assembly of the present invention;

FIG. 7 is an end elevational view partially in section of the embodiment of FIG. 6;

FIG. 8 is a top view of a section of the vibration reduction assembly taken along line 8—8 of FIG. 6;

FIG. 9 is a view taken along line 9—9 of FIG. 7 and looking in the direction of the arrows; and FIG. 10 is an enlarged view, partially broken away, of a portion of the embodiment of FIG. 6.

DETAILED DESCRIPTION OF THE PREFERRED EMBODIMENTS

Referring to the drawings FIGS. 1-4 show a first preferred embodiment of the vibration reduction assembly of the present invention shown in combination with a dynamoelectric machine 10 including a cover 12. The cover 12 includes one, preferably two, lifting studs 14 which may be an eyebolts. The vibration reduction assembly 15, as best shown in FIGS. 3 and 4, includes a plurality of spaced neoprene pads 16 provided between the cover 12 and the machine 10. The vibration reduction assembly 15 also includes a plurality of closed cell foam rubber strips 18 positioned between adjacent ones of the plurality of neoprene pads 16. The cover 12 is affixed to the machine 10 with a plurality of bolts 20, each engaging a neoprene washer 22, a flat metal washer 23 and a neoprene sleeve 24.

The dynamoelectric machine 10 may be a motor of the type known in the trade as WPI (weather protected 1) as shown in FIGS. 1-4 or WP2 (weather protected 2) as shown in FIGS. 6-9. The housing or yoke 26 of the motor preferably has a flat upper surface to receive and support the cover 12. As shown in FIGS. 1 and 2, the cover 12 has a squarish transverse cross-section and a rectangular longitudinal cross-section. The cover 12 preferably includes a plurality of vents (not shown)

which enable the cover to carry out its normal function of guiding air into and out of the machine 10 while protecting the machine 10 from airborne water, snow and dirt. The cover 12 may be cast with vents in place or may be fabricated from sheet metal. However the cover 12 is made, for a heavy-duty electric motor, the cover is quite massive and may weigh approximately 1,000 pounds. As a result, the neoprene pads 16 and indeed the entire vibration reduction assembly 15 must be designed to obtain low transmissibility of vibration caused by the machine while being sufficiently resilient to avoid metal to metal contact.

A preferred manner of accomplishing vibration reduction may be understood with reference to FIGS. 3 and 4. As shown in FIG. 3, a neoprene pad 16 is placed adjacent each corner of the cover 12 in order to isolate the cover 12 from the machine 10. The size and density of the neoprene pad 16 is selected in accordance with the size and weight of the cover, as well as based upon the frequency of the vibration coming from the machine or motor 10 which must be reduced. Preferably, the neoprene pads selected will help obtain low transmissibility for 7200 and 3600 rpm vibration. Suitable neoprene pads may be obtained from Ace Gasket Company, Cincinnati, Ohio. For example, the neoprene pads 16 may have a compressibility of between about 20 and 100 durometer. For heavy-duty applications such as the machine 10 illustrated in FIG. 1, the compressibility of the neoprene pads 16 should preferably be about 30–60 durometer with about 40–50 being most preferred.

As a person of ordinary skill in the art knows, when the cover 12 is placed on the neoprene pad 16, it compresses the neoprene pad 16. Depending on the compressibility or density of the particular neoprene pad used, the thickness of the pad 16 adopted may vary but may be calculated in accordance with the data and related formulas on compression pads included in the reference text by Charles E. Crede entitled *Vibration and Shock Isolation* (Wiley 1951), Chapters 2 and 5, the contents of which are incorporated by reference herein as background. By calculating the load carried by the pads, and the ratio of the load-carrying area to the lateral expansion area, one can determine the appropriate stiffness of neoprene pad 16 to use to obtain low transmissibility of a particular frequency vibration from the machine 10. In the example of a cover weighing about 1000 pounds (as illustrated in FIGS. 1–4), four neoprene pads of 50 durometer stiffness having an area of about 2.63 sq. in. and a thickness of about 0.5 inches should preferably be used. Depending upon the application and compressibility of the neoprene used, the pad 16 may vary in thickness from about 0.2 to about 1 inch. The isolation assembly also includes foam rubber strips 18 as shown in FIG. 3. Referring to FIG. 3, one of the closed cell foam rubber strips 18a extends longitudinally along the housing between neoprene pads 16 positioned in the corners. Another pair of strips 18b extends transversely from neoprene pad 16 to neoprene pad 16 adjacent an end of the housing or yoke 26. A third pair of strips 18c lies transversely and is spaced inwardly from the second pair 18b, as shown in FIG. 3. Each foam strip 18 should be approximately an inch wide and as thick as the neoprene pad in order to seal a gap between the yoke 26 and the cover 12 created by insertion of the neoprene pad 16. The foam rubber strips 18 prevent leakage of air, water, dirt or other precipitation across the joint. The foam strips 18 should have a thickness of about 0.56 inch. As with the neoprene pads, closed cell foam rubber strips (Grade SLE-41) may be obtained from Ace Gasket, Cincinnati, Ohio.

A further important aspect of the vibration reduction assembly 15 includes the means for fastening the cover 12 to the machine 10. As mentioned briefly above, the bolts or screws 20 used to accomplish this should preferably be insulated from contact with another metal surface by use of a neoprene washer 22 and a neoprene sleeve 24. The particular size of the washer 22 and sleeve 24 will depend on the size of the bolt 20, and on the size and weight of the cover and the machine. It is considered a matter of design choice to pick an appropriate bolt 20 to affix the cover 12 to the machine 10. Preferably, however, the neoprene washer 22 should be made from 40–60 durometer neoprene, to support the weight of the cover 12. In assembling the combination of motor 10, cover 12, and vibration reduction assembly 15, the screw 20 should be snugged to compress the neoprene washer approximately 0.03 inch, and coated with Loctite to hold the screw 20 in place.

A further feature of the invention for either embodiment includes the manner for attaching the eyebolt or lifting stud 14, as illustrated in FIG. 5. Once again, to avoid metal to metal contact which produces unwanted vibration and noise, a neoprene washer 40 should be installed between the eyebolt 14 and the cover 12 and a neoprene tube 42 should be installed on the shank 44 of the eyebolt 14. As with the bolts or screws 20 which fasten the cover 12 to the machine 10, the Loctite helps keep the fastener from slipping.

FIGS. 6–9 show another preferred embodiment of the invention which additionally includes side air ducts 30 for additional weather protection. As shown in FIG. 10, the side air duct 30 is attached by a hex cap screw 32 inserted through a flat washer 34 and a neoprene washer 36. Between the side air duct 30 and the wall of the yoke 26 should be inserted a closed cell foam rubber gasket 38. Preferably a pair of side air ducts 30 are used, to permit air entry on both sides of the yoke 26, or one to permit intake of air on one side of the yoke 26, the other to permit exhaust of air on the other side of the yoke 26. Optionally, a closed cell foam rubber gasket may be inserted where the side air duct 30 meets the cover 12 to seal the structure. The side air duct 30 is vibrationally isolated from the machine 10 but need not be isolated from the cover 12.

Once the proper dimensions of the various components have been determined, assembly is rather straightforward. The four neoprene pads 16 are positioned in the four corners of the yoke 26. The first pair of foam rubber strips 18a is positioned longitudinally on the yoke 26 between the neoprene pads 16 adjacent each end of the yoke 26. A second pair of foam rubber strips 18b is positioned transversely between neoprene pads 16 adjacent each end of the yoke 26. The pads and the strips are glued in place using a spray adhesive. Bolts 20 including the neoprene washer 22, flat washer 23, and neoprene sleeve 24 are fitted in openings (not shown) in the yoke 26 and cover 12 and can be snugged up to compress the neoprene washer 22 about 0.03 inches.

Thus there is provided in accordance with the present invention a novel and highly effective assembly for reducing vibration in a weather protected electric motor which helps to increase the life of the motor. The construction of the assembly is such that one can obtain a low transmissibility for 7200 and 3600 rpm vibrations from the motor to the cover. In this way, the primary frequencies of concern are reduced, such as twice line frequency, twice rotational frequency, and rotational frequency. However, vibrations at other frequencies will also be reduced, and the assembly can be adjusted for vibration reduction in smaller or larger motors. Advantageously, the addition of the isolation system also reduces vibration of the top cover which helps lengthen the cover's lifetime in addition to reducing motor noise. In addition, the isolation assembly reduces the transmission of vibration from the top cover to the machine, helping to lengthen the life of the machine. It should be apparent to a person of ordinary skill that the vibration reduction assembly of the present invention provides for an easily installed and assembled system wherein the top cover may still carry out its normal functions of guiding intake and exhaust air from the motor while protecting the motor from the atmosphere.

Many modifications of the preferred embodiments of the invention disclosed above will occur to those skilled in the art. While the invention is particularly adapted for use with electric motors, it can also be employed with electric generators and other rotary machines that produce vibrations which must be reduced without interfering with cooling ventilation. Accordingly, it is therefore intended that all such changes and modifications to the preferred embodiment be covered by the following claims including all equivalents.

I claim:

1. In combination, a dynamoelectric machine, a cover for guiding air into and out of the machine while protecting the machine from airborne water and dirt, a vibration reduction assembly for isolating the cover from the machine, the vibration reduction assembly comprising:

a plurality of spaced neoprene pads positioned adjacent each corner of the cover between the cover and the machine, said pads of a density and size selected to obtain low transmissibility for vibration caused by the machine;

first and second pairs closed cell foam rubber strips positioned between adjacent ones of said plurality of neoprene pads, said strips for filling space between the cover and the machine;

the cover affixed to the machine with a plurality of bolts, each bolt engaging a neoprene washer and a neoprene sleeve.

2. A vibration reduction assembly in accordance with claim 1 additionally comprising at least one eyebolt affixed to the cover for lifting the machine, the eyebolt engaging a neoprene washer and a neoprene sleeve substantially to prevent the eyebolt from contacting the cover.

3. An isolation assembly in accordance with claim 2 wherein the neoprene has a compressibility of between about 20 to about 100 durometer.

4. An isolation assembly in accordance with claim 3 wherein the neoprene has a compressibility of between about 30 to about 60 durometer.

5. An isolation assembly in accordance with claim 3 wherein the dynamoelectric machine is a two pole electric motor, the vibration has a frequency of between 100 to 150 Hz, and the neoprene has a compressibility of about 40-60 durometers.

6. An isolation assembly in accordance with claim 2, wherein four 40-60 durometer neoprene pads are located adjacent four corners of the top cover.

7. An isolation assembly in accordance with claim 6 wherein said first pair of foam rubber strips lies transversely with respect to the machine and the second pair of foam rubber strips lies longitudinally with respect to the machine, thereby defining a rectangle with neoprene pads situated at corners of the rectangle.

8. An isolation assembly in accordance with claim 7 additionally comprising a third pair of foam rubber strips lying transversely with respect to the machine, spaced from the first pair of foam rubber strips.

9. A vibration reduction assembly for a dynamoelectric machine having a yoke and a top cover above the yoke for protecting the machine from airborne precipitation and dust while permitting circulation of cooling air into and from the machine, the assembly comprising:

a plurality of spaced apart neoprene rubber pads positioned adjacent each corner of the top cover between the top cover and the yoke, said neoprene pads selected to substantially reduce transmissibility of vibration from the machine;

a plurality of closed cell foam rubber strips positioned between adjacent ones of said neoprene pads, the strips substantially the same thickness as the pads for filling space between the top cover and the yoke;

the cover affixed to the yoke with a plurality of bolts, each bolt engaging a neoprene washer and sleeve.

10. A high speed electric motor comprising:

a yoke for supporting a stator;

a cover located on top of the yoke including means for guiding air into and out of the motor while protecting the motor from airborne dirt and water;

a vibration reduction assembly for isolating the cover from the yoke, the assembly having a first pair of spaced apart closed cell foam rubber strips oriented transversely to the axis including the yoke, a second pair of spaced apart closed cell foam rubber strips oriented longitudinally with respect to the axis defined by the yoke, the four strips defining a rectangle corresponding to the top cover, with a 40 to 60 durometer neoprene pad located in each corner of the rectangle, the strips being substantially the same thickness as the pads;

a third pair of closed cell foam rubber strips oriented transversely with respect to the yoke and spaced inwardly from the first pair of foam rubber strips; and a plurality of fasteners attaching the cover to the yoke, each fastener engaging a neoprene washer and a neoprene sleeve.

11. A high speed electric motor in accordance with claim 10 additionally comprising a pair of air ducts mounted to opposite sides of the yoke with fasteners engaging neoprene washers and neoprene sleeves.

* * * * *